US008509295B1

United States Patent
Diukman

(10) Patent No.: US 8,509,295 B1
(45) Date of Patent: Aug. 13, 2013

(54) BIT ERROR RATE PREDICTION

(75) Inventor: Iddo Diukman, Haifa (IL)

(73) Assignee: Marvell Israel (M.I.S.L) Ltd., Yokneam (IL)

( * ) Notice: Subject to any disclaimer, the term of this patent is extended or adjusted under 35 U.S.C. 154(b) by 1014 days.

(21) Appl. No.: 12/553,656

(22) Filed: Sep. 3, 2009

Related U.S. Application Data

(60) Provisional application No. 61/094,193, filed on Sep. 4, 2008.

(51) Int. Cl.
*H04B 3/46* (2006.01)
*H04B 17/00* (2006.01)
*H04Q 1/20* (2006.01)

(52) U.S. Cl.
USPC .......................................... 375/227

(58) Field of Classification Search
USPC ........................................ 375/227
See application file for complete search history.

(56) References Cited

U.S. PATENT DOCUMENTS

| | | | | |
|---|---|---|---|---|
| 2007/0009259 | A1* | 1/2007 | Dragovic et al. | 398/27 |
| 2008/0013847 | A1* | 1/2008 | Li | 382/248 |
| 2009/0327379 | A1* | 12/2009 | Matsumoto et al. | 708/250 |
| 2010/0097071 | A1* | 4/2010 | Lee et al. | 324/537 |

* cited by examiner

*Primary Examiner* — Chieh M Fan
*Assistant Examiner* — Tanmay Shah

(57) ABSTRACT

Embodiments of the present disclosure provide a method for predicting bit errors in a communication channel, comprising generating a model representative of the communication channel, formulating enhanced noise at a first noise level that is higher than a second noise level, the second noise level corresponding to a level of noise that the communication channel experiences during a general operation of the communication channel, simulating an operation of the model by injecting the enhanced noise into the model, determining actual bit errors of the model when the model is simulated with the enhanced noise, and estimating a bit error rate (BER) when the model of the communication channel is operated with noise of the second level. Other embodiments are also described and claimed.

20 Claims, 3 Drawing Sheets

BIT ERROR RATE PREDICTION

CROSS REFERENCE TO RELATED APPLICATIONS

The present application claims priority to U.S. Provisional Patent Application No. 61/094,193 filed Sep. 4, 2008, entitled "Prediction of Low BER Values in Data Channels Using Simulations with Enhanced Noise," the entire specification of which is hereby incorporated by reference in its entirety for all purposes, except for those sections, if any, that are inconsistent with this specification.

TECHNICAL FIELD

Embodiments of the present invention relate to bit error rates in communication channels, and more particularly, to predicting bit error rates.

BACKGROUND

Recent developments have increased the data rate, operating frequency and bandwidth of communication channels, while decreasing a bit error rate (BER) of the channels. BER typically forms an important performance criterion during design, development, testing and/or operation of many systems. In some systems BER (which is defined as (number of bit errors)/(total number of bits transmitted)) is as low as 1e-12 to 1e-18. Thus, for an error in 1 bit to take place, statistically 1e12 to 1e18 number of bits needs to be processed, on average. The exceedingly low rate of bit errors in some communication systems renders impractical the testing of actual bit errors.

SUMMARY

In an embodiment, the present disclosure provides an apparatus and a method for estimating bit errors in a communication channel, comprising generating a model representative of the communication channel, said model including a transmitter module and a receiver module, formulating enhanced noise at a first noise level that is higher than a second noise level, where the second noise level corresponds to a level of noise that the communication channel experiences during a general operation of the communication channel, simulating an operation of the model by injecting the enhanced noise into the model, determining actual bit errors of the model when the model is simulated with the enhanced noise, and estimating a bit error rate (BER) when the model of the communication channel is operated with noise of the second level, based at least in part on the determined actual bit errors when the model is simulated with the enhanced noise.

In an embodiment, estimating the BER comprises extrapolating the actual bit errors when the model is simulated with the enhanced noise to estimate the BER when the model is operated with noise of the second level. Extrapolating the actual bit errors comprises determining a statistical distribution of the noise and estimating the BER based on an inverse distribution function and a ration between the first noise level and the second noise level. In an embodiment, the estimated BER is a BER that the communication channel will likely experience during the general operation of the communication channel. The enhanced noise may be formulated at the first noise level such that the enhanced noise is a Gaussian noise with a first standard deviation that is higher than a second standard deviation of noise of the second noise level. In an embodiment, estimating the BER further comprises extrapolating the actual bit errors to estimate the BER, based at least in part on an inverse Gaussian distribution function and on a ratio between the first standard deviation and the second standard deviation.

There is also provided, in an embodiment, a system comprising a model representative of a communication channel, the model comprising a driver module configured to receive a pseudo-random binary sequence of data during a simulation of the model, an interconnect module configured to transmit the received pseudo-random binary sequence of data from the driver module to a receiver module during the simulation, and the receiver module configured to receive, during the simulation, the pseudo-random binary sequence of data, subsequent to injection of enhanced noise in the pseudo-random binary sequence of data. In an embodiment, the system also includes a noise injection module configured to formulate the enhanced noise at a first noise level that is higher than a second noise level and to inject the enhanced noise in the model during the simulation of the model, where the second noise level corresponds to a level of noise that the communication channel experiences during a general operation of the communication channel, a bit error rate (BER) analyzer module operatively coupled to the receiver module and configured to determine actual bit errors during the simulation, and an extrapolation module operatively coupled to the BER analyzer module and configured to estimate a BER when the model is operated with noise of the second level, based at least in part on the determined actual bit errors when the model is simulated with the enhanced noise.

In an embodiment, the BER analyzer module is further configured to receive an output of the receiver module, to receive the pseudo-random binary sequence of data received by the driver module, to compare the received output of the receiver module and the pseudo-random binary sequence of data received by the driver module, and to determine the actual bit errors based at least in part on the comparison. In an embodiment, the noise injection module is configured to formulate the enhanced noise at the first noise level such that the enhanced noise is a Gaussian noise with a first standard deviation that is higher than a second standard deviation, wherein the of noise of the second noise level is Gaussian noise with the second standard deviation. In an embodiment, the extrapolation module is configured to estimate the BER by extrapolating the actual bit errors, based at least in part on an inverse Gaussian distribution function and on a ratio between the first standard deviation and the second standard deviation. In an embodiment, the estimated BER is the BER that the communication channel will likely experience during a general operation of the communication channel.

There is also provided, in an embodiment, a machine-readable medium having associated instructions, which, when executed, cause the machine to perform the actions of generating a model representative of the communication channel, said model including a transmitter module and a receiver module, formulating enhanced noise at a first noise level that is higher than a second noise level, the second noise level corresponding to a level of noise that the communication channel experiences during a general operation of the communication channel, simulating an operation of the model by injecting the enhanced noise into the model, determining actual bit errors of the model when the model is simulated with the enhanced noise, and estimating a BER when the model of the communication channel is operated with noise of the second level, based at least in part on the determined actual bit errors when the model is simulated with the enhanced noise. In an embodiment, estimating the BER comprises extrapolating the actual bit errors when the model is simulated with the enhanced noise to estimate the BER when the model is operated with noise of the second level.

BRIEF DESCRIPTION OF THE DRAWINGS

Embodiments of the present invention will be readily understood by the following detailed description in conjunction with the accompanying drawings. Embodiments of the invention are illustrated by way of example and not by way of limitation in the figures of the accompanying drawings.

DETAILED DESCRIPTION OF EMBODIMENTS OF THE INVENTION

Figure 1:
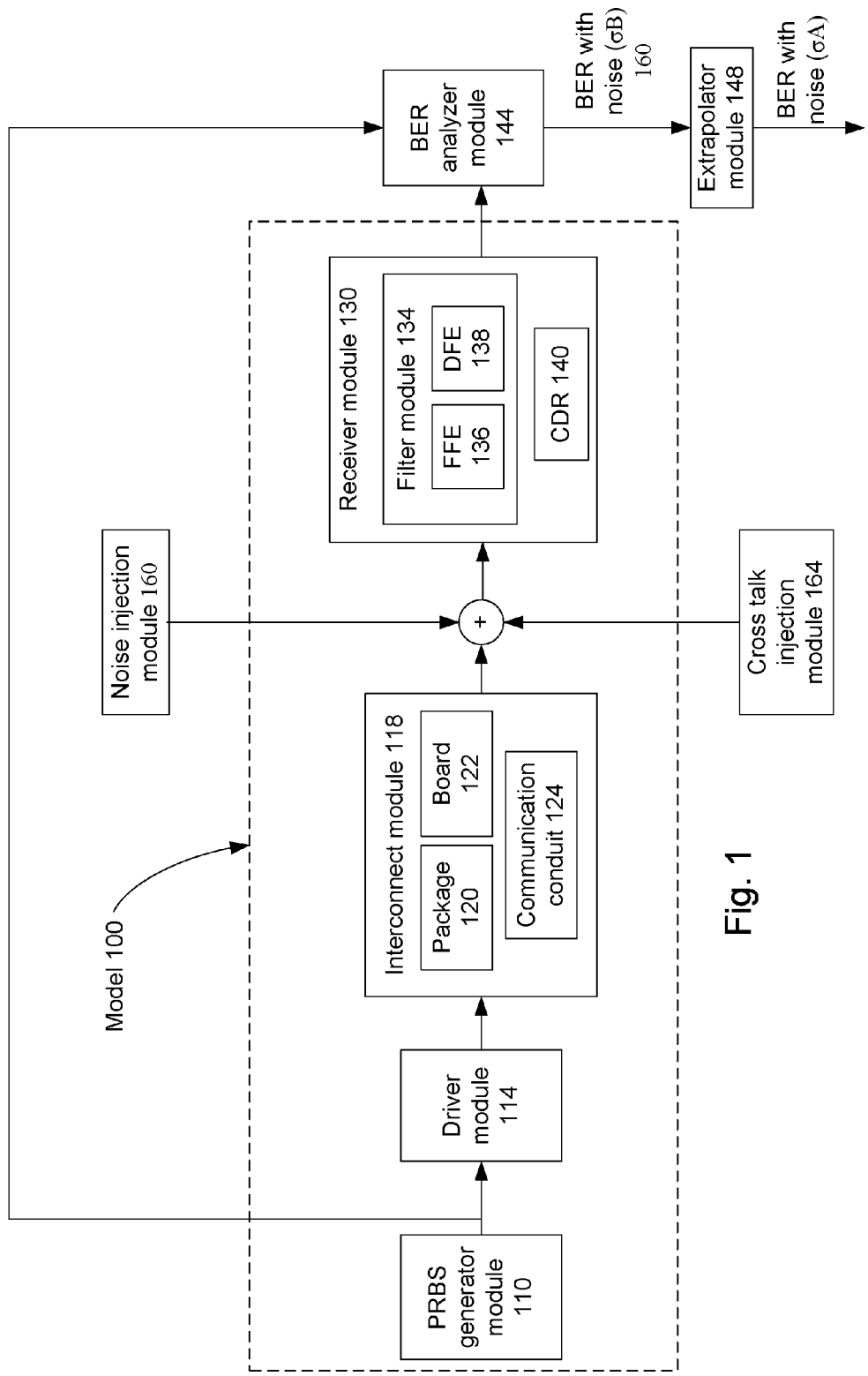
FIG. 1 schematically illustrates an example model representative of a communication channel, in accordance with an embodiment of the present disclosure.

FIG. 1 schematically illustrates an example model 100 representative of a communication channel, in accordance with an embodiment of the present invention. The model 100 is developed, for example, during a design, testing, development, and/or operational phase of the communication channel. In an embodiment, the model 100 is developed using one or more appropriate design or simulator software, e.g., Matlab® and Simulink® developed by The MathWorks Corporation, SPICE (Simulation Program with Integrated Circuit Emphasis), and/or the like.

In an embodiment of the disclosure, the model 100 includes a pseudorandom binary sequence (PRBS) generator module 110 that is configured to generate a pseudorandom sequence of binary bits during a simulation of the model 100. When the actual communication channel is in operation, a data source (e.g., a user speaking in a cellular phone, a bit stream passing through a switch, or data transferred over a bus) generates a binary bit sequence. In the model 100 of the communication channel, the PRBS generator module 110 is configured to simulate or model such a data source.

In the embodiment seen in FIG. 1, the model 100 additionally includes a driver module 114 that is modeled to simulate a driver and/or a transmitter of the actual communication channel (i.e., the communication channel that the model 100 represents). The driver module 114 is modeled in any suitable modeling tool, for example, in Matlab® using a behavioral 1-tap pre-emphasis model of a driver and/or transmitter of the actual communication channel.

The model 100 also includes an interconnect module 118. The interconnect module 118 models an interconnect of the actual communication channel, interconnecting the transmitter and a receiver of the channel. In an embodiment of the disclosure, the interconnect module 118 suitably corresponds to model of a wireless and/or wired interconnect.

An interconnect of the actual communication channel typically includes various parts, e.g., board, packaging, a wired or wireless communication conduit, etc. Accordingly, in the model 100, the interconnect module 118 includes, for example, a package module 120, a board module 122, a communication conduit module 124, and/or the like. The package module 120 and the board module 122 includes, for example, estimated scattering parameters (S-parameter) and/or other parameters of the package and the board, respectively, of the interconnect of the actual communication channel. For example, the package module 120 and the board module 122 includes estimated capacitance of the die and/or packaging at the transmitting and/or receiving end of the interconnect of the actual communication channel. In an embodiment, one or more of these parameters used in the interconnect module 118 are modeled using S parameters measured with a network analyzer in an existing interconnect, and/or extracted from the layout using an appropriate 3-dimensional extraction tool such as HFSS®, PowerSI®, and/or the like.

The model 100 also includes a receiver module 130 that is modeled to simulate a receiver of the actual communication channel. The receiver module 130 includes models of various components of the receiver of the actual communication channel, including, for example, a filter module 134 (which models one or more filters of the actual communication channel), a clock data recovery (CDR) module 140 (which models a CDR of the actual communication channel), etc. The filter module 134 includes, for example, a feed-forward equalizer (FFE) module 136 (which models an FFE filter in the actual communication channel) and/or a decision feedback equalizer (DFE) module 138 (which models a DFE filter in the actual communication channel). Other suitable analog and digital filters may be modeled instead of, or in addition to, the FFE and DFE filters. In an embodiment, at least a part of the receiver module 130 (e.g., the DFE module 138 and/or the CDR module 140) is modeled in Matlab® using, for example, a behavioral algorithmic model. In an embodiment, at least a part of the FFE module 136 is constructed, for example, by extracting frequency domain FFE curves by running an AC sweep spice simulation on an FFE cell spice netlist model.

Modeling and/or generation of the PRBS generator module 110, driver module 114, interconnect module 118 and/or the receiver module 130 are not described in detail in order to avoid key obfuscating teaching points of this disclosure.

In an embodiment, the model 100 is operatively coupled to a noise injection module 160 that introduces noise in the model 100 during a simulation of the model. The model 100 is also operatively coupled to a cross talk module 164 that introduces cross talk in the model 100 during a simulation of the model 100.

The noise injection module 160 and the cross talk module 164 are illustrated to inject noise and cross talk in the model 100 between the interconnect module 118 and the receiver module 130. However, although not illustrated, in another embodiment, the noise injection module 160 and/or the cross talk module 164 injects noise and/or cross talk in one or more other parts of the model 100 (e.g., in the communication conduit module 124, the PRBS generator module 110, the driver module 114, the receiver module 130, and/or between any two modules of the model 100). In an embodiment, one or more parts of the module 100 in which noise and/or cross talk is injected is based at least in part on one or more noise and/or cross talk sources in the actual communication channel. Although not illustrated, in another embodiment, the noise injection module 160 and the cross talk module 164 are part of the model 100.

In an embodiment, the model 100 (e.g., the receiver module 130) is operatively coupled to a BER analyzer module 144 and/or an extrapolator module 148. Although illustrated as not being part of the model 100, in an embodiment, the BER analyzer module 144 and/or the extrapolator module 148 are included as part of the model 100. In another embodiment, a BER analyzer and/or an extrapolator are not present in the actual communication channel that is represented by the model 100.

In an embodiment, it is possible to predict or estimate an operating condition of the actual communication channel during, for example, a general, typical or regular operation of the channel. For example, it is possible to estimate or predict a noise level that the communication channel experiences during a general operation of the channel. During a general operation, the communication channel may experience a random noise, which is, for example, additive white Gaussian noise (AWGN) with a known standard deviation. For example, the standard deviation of the Gaussian noise that the actual communication channel experiences is approximately equal to a known value σA.

In an embodiment, Gaussian noise (with standard deviation σA) that is estimated or predicted to be experienced by the actual communication channel is enhanced or magnified to formulate enhanced Gaussian noise (henceforth also referred to as enhanced noise) that has, for example, a standard deviation σB that is greater than σA.

In an embodiment, for the purpose of this disclosure and unless otherwise mentioned, a level of a noise is associated with a standard deviation of the noise. Thus, a noise with a relatively higher level has a relatively higher standard deviation. Thus, if the Gaussian noise (with standard deviation σA) estimated or predicted to be experienced by the actual communication channel has a first noise level, the newly formulated and enhanced Gaussian noise (with standard deviation σB) has a second noise level that is higher than the first noise level.

In an embodiment, during a simulation of the model 100, the enhanced Gaussian noise (with standard deviation σB) is injected in the model 100 by the noise injection module 160. That is, the model 100 is simulated with enhanced noise that has a relatively higher noise level compared to the noise level that the actual communication channel usually or typically experiences during general operation.

In an embodiment, while simulating an operation of the model 100, the BER analyzer module 144 analyzes and determines actual bit errors occurring during the simulation of the model and/or an associated BER of the model 100, with the enhanced noise injected by the noise injection module 160 in the model 100. For example, while simulating an operation of the model 100, the PRBS generator module 110 generates a sequence of pseudorandom bits (e.g., a pseudorandom data stream). Various components (e.g., the driver module 114, interconnect module 118, and the receiver module 130) of the model 100 processes the data stream, and the BER analyzer module 144 receives the data stream from the output of the receiver module 130. In an embodiment, the data stream processed by the model 100 is at least in part corrupted by noise and/or cross talk injected by the noise injection module 160 and/or the cross talk module 164. The BER analyzer module 144 also receives the data stream transmitted by the PRBS generator module 110 to the driver module 114, and compares the data stream received directly from the PRBS generator module 110 with the data stream received from the receiver module 130. Based on the comparison, in an embodiment, the BER analyzer module 144 determines the actual bit errors occurred during the simulation and/or the associated BER of the model 100 with enhanced noise (having standard deviation of σB) and/or cross talk injected in the model 100. For example, the BER analyzer module 144 determines a number of bits that have errors (by comparing the bits received from the receiver module 130 and the bits received directly from the PRBS generator 110), and determines the BER by determining a ratio of the number of bits that have errors and the total number of bits transmitted.

As previously discussed, although the actual communication channel experiences a lower level of noise (e.g., noise with standard deviation σA), the model 100 is simulated with a relatively higher level of noise (e.g., the enhanced noise with standard deviation σB). Accordingly, the BER output of the BER analyzer module 144 is higher than the BER of the actual communication channel.

In an embodiment, the extrapolation module 148 receives the output of the BER analyzer module 144 (i.e., the actual bit errors and/or the associated BER of the model 100 during the simulation with the enhanced noise injected), and extrapolates from the received data a BER that the model 100 will likely experience when noise of standard deviation σA is injected in the model 100. In an embodiment, the extrapolated BER is about the same as the BER of the actual communication channel with noise having standard deviation σA injected in the actual communication channel during, for example, a general or typical operation of the communication channel. In an embodiment, the extrapolation is carried out using the output of the BER analyzer module 144, an inverse distribution function of a Gaussian distribution, and using a ratio between the standard deviations of the enhanced noise (e.g., standard deviation σB) and the actual noise (e.g., standard deviation σA) that the actual communication channel is estimated to experience.

Thus, in an embodiment, the output of the extrapolator module 148 is used, for example, in estimating the actual BER that the actual communication channel may likely experience during a general operation. The output of the extrapolator module 148 may be used in a variety of ways, e.g., for testing, developing and/or fine tuning various components of the communication channel, for developing one or more components associated with the communication channel, and/or the like.

Simulating the model 100 using the enhanced noise increases the BER of the model, which is relatively easy to measure using the BER analyzer module 144 within a reasonable amount of time. The actual BER (with lower level of noise) is then extrapolated using the extrapolation module 148. If the model 100 were to be simulated using the actual noise (e.g., noise with standard deviation σA), it would have taken relatively much longer time to calculate the BER, as the BER would have been considerably lower (as higher number of bits had to be generated by the PRBS generator module 110, and simulated by the model 100 to reasonably accurately calculate the actual BER).

Figure 2:
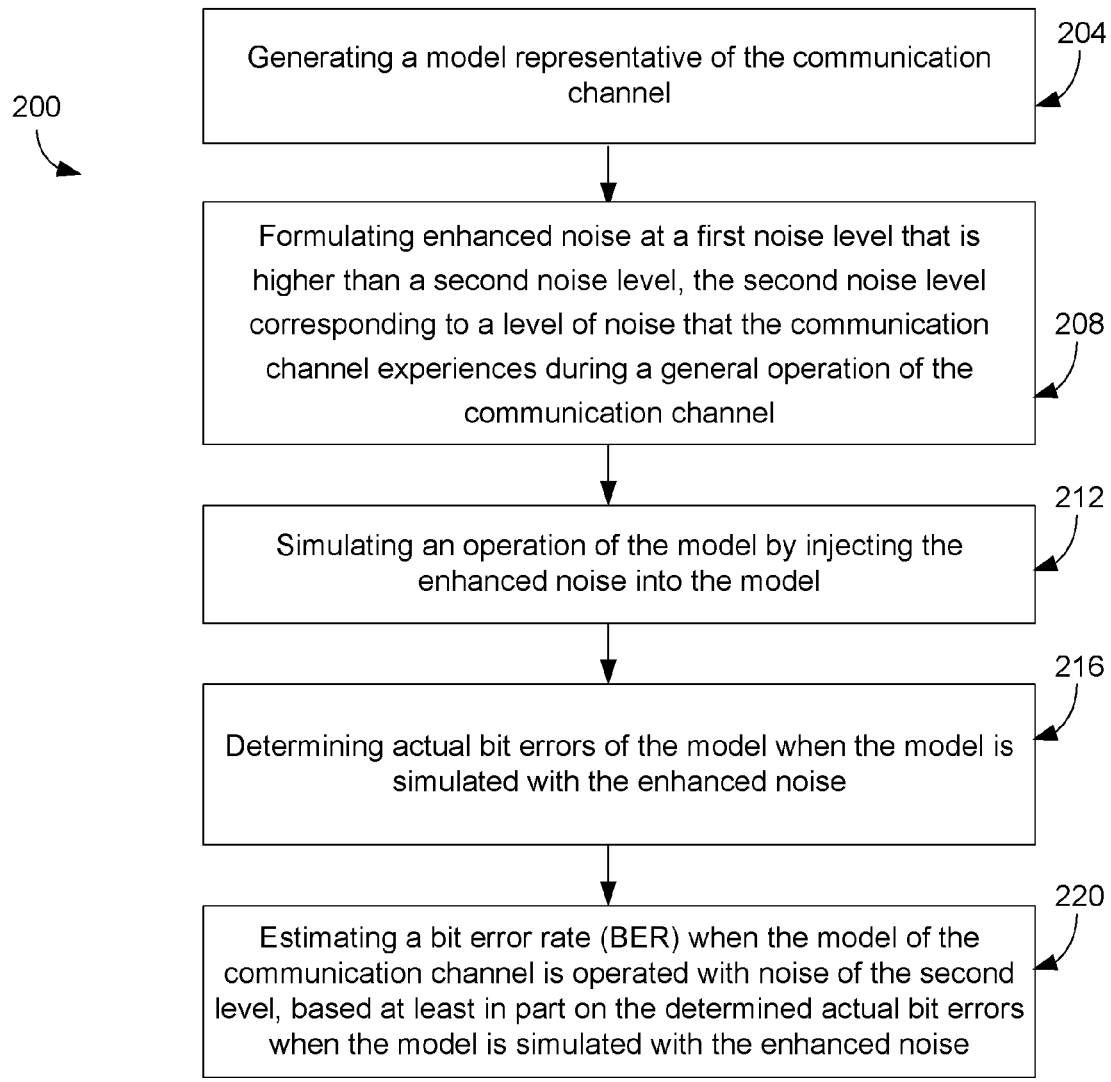
FIG. 2 illustrates an example method for estimating a BER of a communication channel, in accordance with an embodiment of the present disclosure.

FIG. 2 illustrates an example method 200 for estimating a BER of a communication channel, in accordance with an embodiment of the present disclosure. Referring to FIG. 2, in an embodiment, the method 200 includes, at 204, generating or formulating a model (e.g., model 100 of FIG. 1) representative of a communication channel, as previously discussed.

In an embodiment, the method 200 further includes, at 208, formulating enhanced noise at a first noise level that is higher than a second noise level. The second noise level corresponds to a level of noise that the communication channel experiences during a general or typical operation of the communication channel. For example, the enhanced noise at the first noise level is formulated such that the enhanced noise is Gaussian noise with a first standard deviation (e.g., standard deviation of about σB) that is higher than a second standard deviation (e.g., standard deviation of about σB). The noise of the second noise level, which the communication channel experiences during a general or typical operation of the communication channel, is Gaussian noise with the second standard deviation σB. Thus, in an embodiment, the second noise level (e.g., the second standard deviation) is estimated (e.g., by estimating the level or standard deviation of the noise to be likely experienced by the communication channel during the general operation of the channel), and the enhanced noise is formulated based at least in part on this estimation. In an embodiment, the enhanced noise is formulated by the noise injection module 160.

In an embodiment, the method 200 further includes, at 212, simulating an operation of the model 100 by injecting (e.g., using the noise injection module 160) the enhanced noise into the model 100 (e.g., into the interconnect module 118 and/or in any other component of the model 100). For example, during the simulation of the model 100, the transmitter or driver module 114 receives a pseudo-random binary sequence of data from the PRBS generator module 110, the noise injection module 160 injects the enhanced noise, and the receiver module 130 receives the pseudo-random binary sequence of data with the enhanced noise injected in the data.

In an embodiment, the method 200 further includes, at 216, determining actual bit errors of the model 100 when the model 100 is simulated with the enhanced noise. For example, the BER analyzer module 144 receives the pseudo-random binary sequence of data generated by the PRBS generator module 110, receives the output of the receiver module 130, and compares the two data stream to determine the actual bit errors (and/or the associated BER) that occurs during the simulation.

In an embodiment, the method 200 further includes, at 216, estimating a BER when the model 100 is operated with noise of the second level, based at least in part on the determined actual bit errors when the model is simulated with the enhanced noise. For example, the extrapolator module 148 receives the output of the BER analyzer module 144 (e.g., the actual bit errors when the model is simulated with the enhanced noise and/or the associated BER), and extrapolates the actual bit errors to estimate the BER when the model is operated with noise of the second level. In an embodiment, the extrapolator module 148 performs such extrapolation based on the actual bit errors (and/or a BER associated with the actual bit errors, i.e., the BER of the model when the model is simulated with the enhanced noise), an inverse Gaussian distribution function and on a ratio between the first standard deviation and the second standard deviation. In an embodiment, the estimated BER is the BER that the communication channel will likely experience during the general or typical operation of the communication channel.

Figure 3:
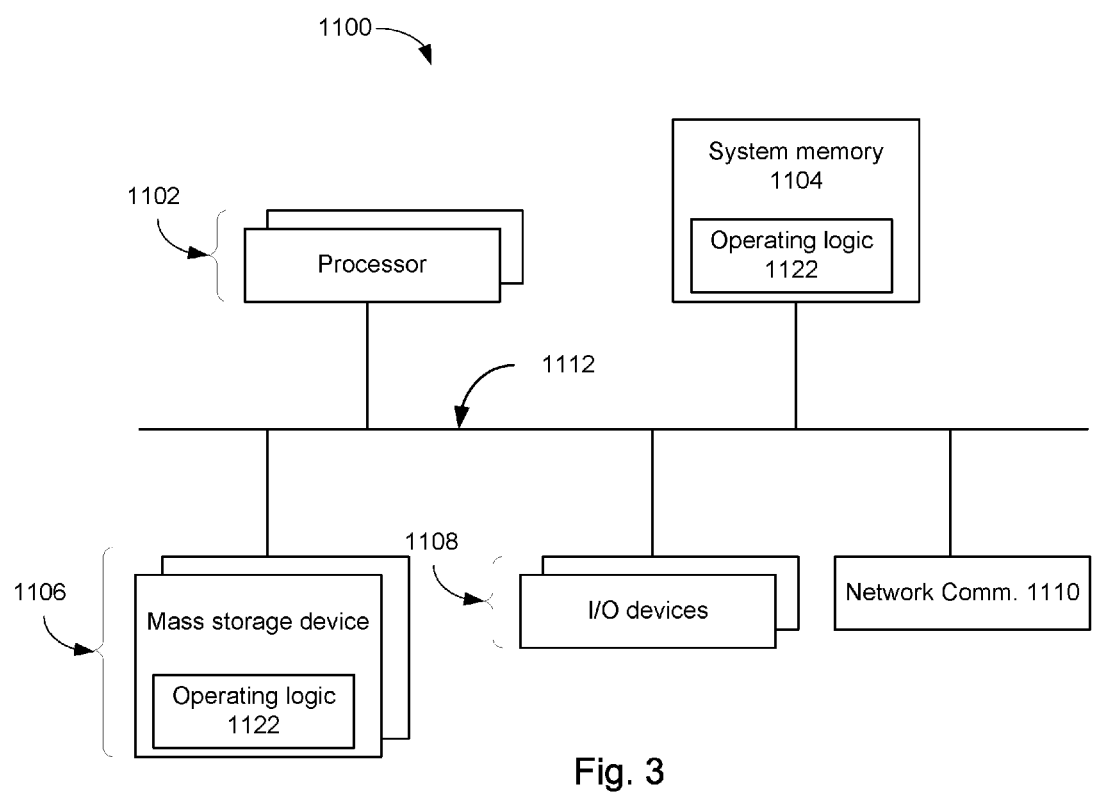
FIG. 3 is a simplified block diagram of a system in which embodiments of the present disclosure is implemented.

FIG. 3 is a simplified block diagram of an illustrative system 1100 in which an embodiment of the present disclosure may be implemented. As illustrated, system 1100 includes one or more processors or processor cores 1102, and system memory 1104. For the purpose of this application, including the claims, the terms "processor" and "processor cores" are considered synonymous, unless the context clearly requires otherwise. Additionally, as seen in FIG. 3, system 1100 includes mass storage devices 906 (such as diskette, hard drive, compact disc read only memory (CDROM) and so forth), input/output devices 1108 (such as a display to render visual manifestation, a keyboard, a cursor control, and so forth) and communication interfaces 1110 (such as network interface cards, modems and so forth). The elements of FIG. 3 are operatively coupled to each other via system bus 1112, which represents one or more buses. In the case of multiple buses, they are bridged by one or more bus bridges (not illustrated).

Each of these elements performs typical functions. For example, system memory 1104 and mass storage 1106 are employed to store a working copy and a permanent copy of the programming instructions implementing all or a portion of earlier described functions, herein collectively denoted as 1122. The instructions 1122 are assembler instructions supported by processor(s) 1102 or instructions that can be compiled from high level languages, such as C.

The permanent copy of the programming instructions is placed into permanent storage 1106 in the factory, or in the field, through, for example, a distribution medium (not shown), such as a compact disc (CD), or through communication interface 1110 (from a distribution server (not shown)). That is, one or more distribution media having instructions 1122 are employed to distribute the instructions 1122 and program various computing devices.

In an embodiment, the processor(s) 1102 are configured to facilitate estimating a first level of noise that a communication channel operatively coupled with system 1100 will likely experience during a general operation. In an embodiment, the first level of noise in a communication channel is estimated by formulating noise of a second level, wherein the second level is higher than the first level, forming a model representative of the communication channel, simulating an operation of the model of the communication channel, with noise of the second level being injected in the model of the communication channel during the simulating, determining a first bit error rate (BER) of the model of the communication channel while simulating the operation, the first BER corresponding to noise of the second level, and/or extrapolating the first BER corresponding to noise of the second level to obtain a second BER that corresponds to noise of the first level.

In embodiments of the present disclosure, noise in a communication channel is estimated using a computer generated model that is responsive to instructions that are stored on a machine-readable medium. The computer is configured so that when the machine-readable instructions are executed, one or more methods as disclosed herein is implemented. For example, in example embodiments, a machine-readable medium comprises a storage medium and a plurality of programming instructions stored in the storage medium and configured to program the machine to formulate a model (e.g., model 100 of FIG. 1) of a communication channel, estimate a first level of noise that a communication channel will likely experience during a general operation, formulate noise of a second level, wherein the second level is higher than the first level, form a model representative of the communication channel, simulate an operation of the model of the communication channel, with noise of the second level being injected in the model of the communication channel during the simulating, determine a first bit error rate (BER) of the model of the communication channel while simulating the operation, the first BER corresponding to noise of the second level, extrapolate the first BER corresponding to noise of the second level to obtain a second BER that corresponds to noise of the first level, and/or perform one or more operations illustrated in FIG. 2.

Although specific embodiments have been illustrated and described herein, it is noted that a wide variety of alternate and/or equivalent implementations may be substituted for the specific embodiment illustrated and described without departing from the scope of the present invention. This present disclosure covers all methods, apparatus, and articles of manufacture fairly falling within the scope of the appended claims either literally or under the doctrine of equivalents. For example, although the above discloses example systems including, among other components, software or firmware executed on hardware, it should be noted that such systems are merely illustrative and should not be considered as limiting. This application is intended to cover any adaptations or variations of the embodiment discussed herein. Therefore, it is manifested and intended that the invention be limited only by the claims and the equivalents thereof.

What is claimed is:

1. A method for estimating bit errors in a communication channel, comprising:
   generating a model using a hardware processor representative of the communication channel, said model including a transmitter module and a receiver module;
   formulating enhanced noise at a first noise level that is higher than a second noise level, the second noise level corresponding to an estimated level of noise likely to be experienced by the communication channel during a general operation of the communication channel;
   simulating an operation of the model by injecting the enhanced noise into the model;
   determining actual bit errors of the model when the model is simulated with the enhanced noise; and
   estimating a bit error rate (BER) when the model of the communication channel is operated with noise of the second level, based at least in part on the determined actual bit errors when the model is simulated with the enhanced noise.

2. The method of claim 1, wherein estimating the BER comprises:
   extrapolating the actual bit errors when the model is simulated with the enhanced noise to estimate the BER when the model is operated with noise of the second level.

3. The method of claim 2, wherein extrapolating the actual bit errors comprises:
   determining a statistical distribution of the noise and estimating the BER based on an inverse distribution function and a ratio between the first noise level and the second noise level.

4. The method of claim 1, wherein said determining the actual bit errors further comprises:
   receiving a pseudorandom binary sequence of data generated by a pseudorandom binary sequence generator module;
   receiving an output from the receiver module of the model into which the pseudorandom binary sequence of data and the enhanced noise are injected;
   comparing the pseudorandom binary sequence of data generated by the pseudorandom binary sequence generator module and the output received from the receiver module; and
   determining the actual bit errors based at least in part on said comparing.

5. The method of claim 1, wherein said simulating the operation of the model further comprises:
   receiving a pseudo-random binary sequence of data in the transmitter module of the model;
   injecting enhanced noise in an interconnect module of the model; and
   receiving the pseudo-random binary sequence of data, with the enhanced noise injected, in the receiver module.

6. The method of claim 1, wherein forming the model further comprises:
   forming the model using one or more software tools from a group comprising MatLab, SPICE, HFSS, and PowerSI.

7. The method of claim 1, wherein the estimated BER is a BER that the communication channel will likely experience during the general operation of the communication channel.

8. The method of claim 1, wherein formulating the enhanced noise further comprises:
   formulating the enhanced noise at the first noise level such that the enhanced noise is a Gaussian noise with a first standard deviation that is higher than a second standard deviation of noise of the second noise level, wherein the of noise of the second noise level is Gaussian noise with the second standard deviation.

9. The method of claim 8, wherein said estimating the BER further comprises:
   extrapolating the actual bit errors to estimate the BER, based at least in part on an inverse Gaussian distribution function and on a ratio between the first standard deviation and the second standard deviation.

10. A system comprising:
   a model representative of a communication channel, the model comprising:
      a driver module configured to receive a pseudo-random binary sequence of data during a simulation of the model;
      an interconnect module configured to transmit the received pseudo-random binary sequence of data from the driver module to a receiver module during the simulation; and
      the receiver module configured to receive, during the simulation, the pseudo-random binary sequence of data, subsequent to injection of enhanced noise in the pseudo-random binary sequence of data;
   a noise injection module hardware configured to formulate the enhanced noise at a first noise level that is higher than a second noise level and to inject the enhanced noise in the model during the simulation of the model, where the second noise level corresponds to an estimated level of noise likely to be experienced by the communication channel during a general operation of the communication channel;
   a bit error rate (BER) analyzer module hardware operatively coupled to the receiver module and configured to determine actual bit errors during the simulation; and
   an extrapolation module hardware operatively coupled to the BER analyzer module and configured to estimate a BER when the model is operated with noise of the second level, based at least in part on the determined actual bit errors when the model is simulated with the enhanced noise.

11. The system of claim 10, wherein the BER analyzer module is further configured to receive an output of the receiver module, to receive the pseudo-random binary sequence of data received by the driver module, to compare the received output of the receiver module and the pseudo-random binary sequence of data received by the driver module, and to determine the actual bit errors based at least in part on the comparison.

12. The system of claim 10, wherein the noise injection module is configured to formulate the enhanced noise at the first noise level such that the enhanced noise is a Gaussian noise with a first standard deviation that is higher than a second standard deviation, wherein the of noise of the second noise level is Gaussian noise with the second standard deviation.

13. The system of claim 12, wherein the extrapolation module is configured to estimate the BER by extrapolating the actual bit errors, based at least in part on an inverse Gaussian distribution function and on a ratio between the first standard deviation and the second standard deviation.

14. The system of claim 10, wherein the extrapolation module is configured to estimate the BER by extrapolating the actual bit errors determined during simulation of the model with enhanced noise.

15. The system of claim 14, wherein the extrapolation module is further configured to determine a statistical distribution of the noise and extrapolate the actual bit errors based on an inverse distribution function and a ration between the first noise level and the second noise level.

16. The system of claim 10, wherein the interconnect module models a capacitance and one or more parameters of a package, a board and a communication conduit of an interconnect of the communication system.

17. The system of claim 10, wherein the estimated BER is the BER that the communication channel will likely experience during a general operation of the communication channel.

18. A non-transitory machine-readable medium having associated instructions, which, when executed, cause the machine to perform the operations of:
   generating a model representative of the communication channel, said model including a transmitter module and a receiver module;
   formulating enhanced noise at a first noise level that is higher than a second noise level, the second noise level corresponding to an estimated level of noise likely to be experienced by the communication channel during a general operation of the communication channel;
   simulating an operation of the model by injecting the enhanced noise into the model;
   determining actual bit errors of the model when the model is simulated with the enhanced noise; and
   estimating a bit error rate (BER) when the model of the communication channel is operated with noise of the second level, based at least in part on the determined actual bit errors when the model is simulated with the enhanced noise.

19. The non-transitory machine-accessible medium of claim 18, wherein estimating the BER comprises:
   extrapolating the actual bit errors when the model is simulated with the enhanced noise to estimate the BER when the model is operated with noise of the second level.

20. The non-transitory machine-accessible medium of claim 19, wherein extrapolating the actual bit errors comprises:
   determining a statistical distribution of the noise and estimating the BER based on an inverse distribution function and a ration between the first noise level and the second noise level.

* * * * *